US012681151B2

(12) United States Patent
Galloway et al.

(10) Patent No.: US 12,681,151 B2
(45) Date of Patent: Jul. 14, 2026

(54) LIDAR SENSOR SYSTEM

(71) Applicant: Aurora Operations, Inc., Mountain View, CA (US)

(72) Inventors: Ryan Galloway, Bozeman, MT (US); Evan Rogers, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 1011 days.

(21) Appl. No.: 17/883,273

(22) Filed: Aug. 8, 2022

(65) Prior Publication Data

US 2024/0045034 A1 Feb. 8, 2024

(51) Int. Cl.
*G01S 7/48* (2006.01)
*G01S 7/481* (2006.01)
*G01S 17/34* (2020.01)
*G01S 17/931* (2020.01)

(52) U.S. Cl.
CPC .......... *G01S 7/4817* (2013.01); *G01S 7/4808* (2013.01); *G01S 7/4813* (2013.01); *G01S 17/34* (2020.01); *G01S 17/931* (2020.01)

(58) Field of Classification Search
None
See application file for complete search history.

(56) References Cited

U.S. PATENT DOCUMENTS

| | | | | |
|---|---|---|---|---|
| 10,458,904 | B2 * | 10/2019 | Bartholomew | ....... G01S 7/4812 |
| 10,739,256 | B1 * | 8/2020 | Rickman | ................. G01S 17/42 |
| 2020/0158871 | A1 * | 5/2020 | Rezk | ......................... G01S 17/42 |
| 2020/0333533 | A1 * | 10/2020 | Rogers | ................... G01S 17/89 |
| 2021/0088657 | A1 * | 3/2021 | Shah | ........................ G01S 17/42 |
| 2021/0349196 | A1 * | 11/2021 | Wang | ...................... G01S 7/484 |

* cited by examiner

*Primary Examiner* — Hovhannes Baghdasaryan
(74) *Attorney, Agent, or Firm* — Dority & Manning, P.A.

(57) ABSTRACT

A light detection and ranging (LIDAR) sensor system includes a transmitter, one or more scanning optics, an optical module, and a receiver. The transmitter is configured to output a beam having a linear polarization. The optical module is configured to provide the beam to the one or more scanning optics. The one or more scanning optics are configured to output the beam received from the optical module. The receiver is spaced from the transmitter and receiver configured to receive a return beam from reflection of the beam by an object.

21 Claims, 12 Drawing Sheets

524

LIDAR SENSOR SYSTEM

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) sensor system. The LIDAR sensor system includes a transmitter, one or more scanning optics, an optical module, and a receiver. The transmitter is configured to output a beam having a linear polarization. The optical module is configured to direct the beam to the one or more scanning optics. The one or more scanning optics are configured to output the beam received from the optical module. The receiver is spaced from the transmitter and receiver configured to receive a return beam from reflection of the beam by an object.

At least one aspect relates to an autonomous vehicle control system. The autonomous vehicle control system includes a transmitter, one or more scanning optics, an optical module, a receiver spaced from the transmitter, and one or more processors. The transmitter is configured to output a beam having a linear polarization. The optical module is configured to direct the beam to the one or more scanning optics, the one or more scanning optics configured to output the beam received from the optical module. The receiver is configured to receive a return beam from reflection of the beam by an object. The one or more processors are configured to determine at least one of a range to the object or a velocity of the object based on the beam and control operation of at least one of a steering system of an autonomous vehicle or a braking system of the autonomous vehicle responsive to the at least one of the range or the velocity.

At least one aspect relates to an autonomous vehicle. The autonomous vehicle includes a LIDAR sensor system, a steering system, a braking system, and a vehicle controller. The LIDAR sensor system includes a transmitter configured to output a beam having a linear polarization, one or more scanning optics, an optical module configured to direct the beam to the one or more scanning optics, the one or more scanning optics configured to output the beam received from the optical module, a receiver spaced from the transmitter, the receiver configured to receive a return beam from reflection of the beam by an object, and one or more processors configured to determine at least one of a range to the object or a velocity of the object based on the beam. The vehicle controller is configured to determine, based on the return beam, at least one of a range to the object or a velocity of the object, and control operation of at least one of the steering system or the braking system based on the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

Figure 1:
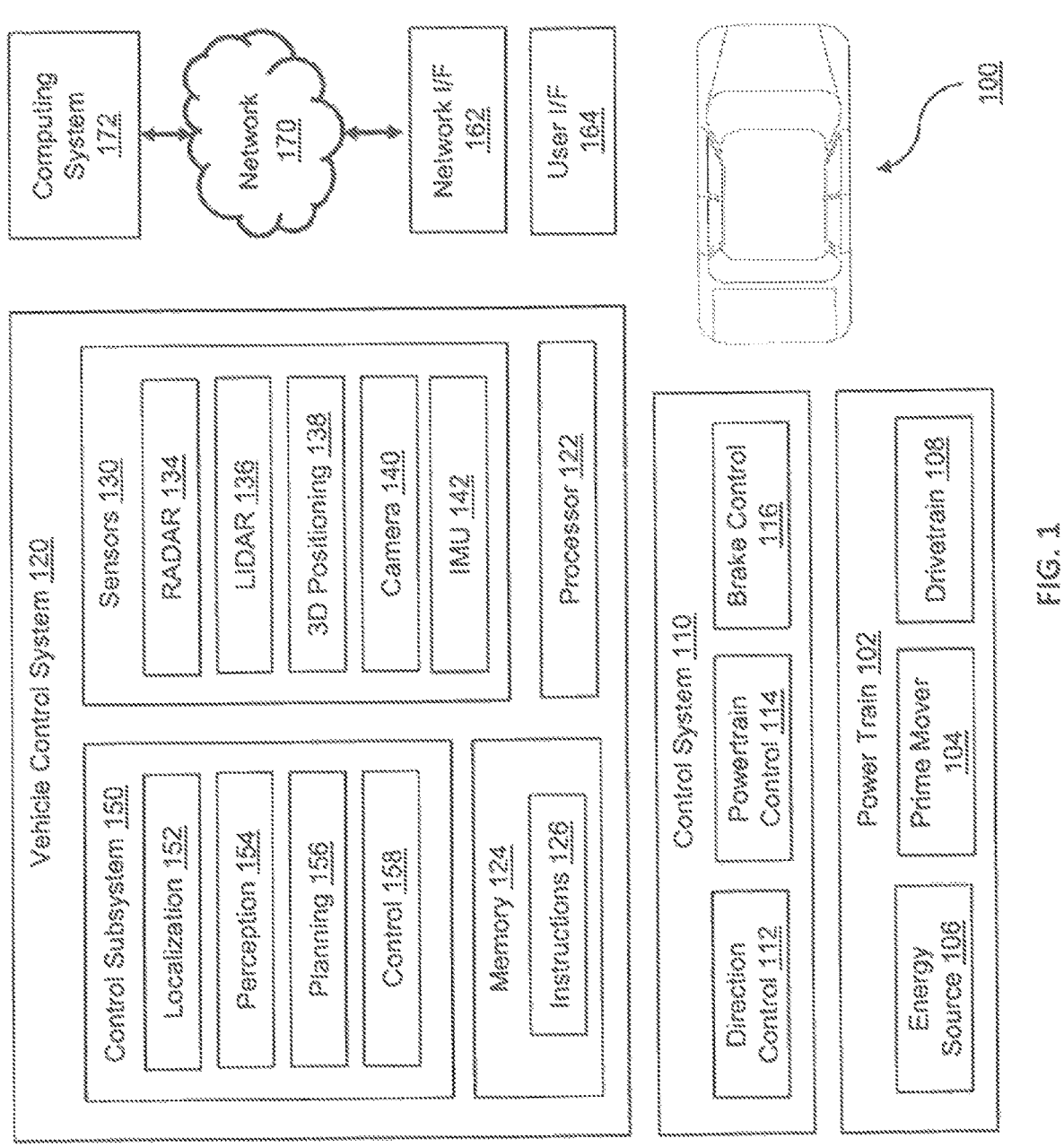
FIG. 1 is a block diagram of an example of a system environment for autonomous vehicles.

A LIDAR sensor system can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

The LIDAR sensor system can include a transmitter, one or more scanning optics, an optical module, and a receiver. The transmitter is configured to output a beam having a linear polarization. The optical module is configured to direct the beam to the one or more scanning optics. The one or more scanning optics are configured to output the beam received from the optical module. The receiver is spaced from the transmitter and receiver configured to receive a return beam from reflection of the beam by an object Systems and methods in accordance with the present disclosure can implement LIDAR sensor systems having greater signal-to-noise ratio, including in applications where the return beam may be returned to a point spaced away from where it was transmitted. This can include, for example, taking advantage of polarization to use light corresponding to the transmitted (transmit) beam and filter out or otherwise use light not corresponding to the transmit beam, so that determination of parameter such as range, velocity, and Doppler components, among others, can be made more accurately. The transmit beam can have a particular polarization, such as linear polarization, and various components of the LIDAR sensor system can take advantage of the linear polarization of the transmit beam to more effectively direct the transmit beam to the environment and/or more effectively receive the return beam and direct the return beam to receiver and detector components (e.g., photodetectors) with greater fidelity with respect to the transmit beam. For example, light having (e.g., associated with) polarizations other than the polarization of the transmit beam can be filtered out so that the information represented by the signal detected by the detector components has a greater correspondence with the transmit beam, such as by using a circulator that can limit the captured light to the polarization of the transmit beam (e.g., a single polarization circulator). A dual polarization circulator can be used to maximize the amount of light received by capturing light of both orthogonal polarizations, while still allowing for more effective correspondence between the transmit beam and the return beam. Various features of the LIDAR sensor system, such as particular optics and arrangements of optics between the transmitter, receiver, and/or scanning optics, can be arranged in particular manners to reduce stray signals passing through the LIDAR sensor system as a result of the use of the particular polarization(s), further improving signal-to-noise ratio. For example, linearly polarized light is less likely to be rotated in polarization phase than circularly polarized light; rotating the polarization—changing the polarization phase—results in signal loss. By using linear polarization as the particular polarization, the LIDAR sensor system can avoid such signal loss. In addition, coatings on the scanning optics can be optimized for the particular arrangement of optical components to improve signal-to-noise ratio, including by improving transmission and reducing back reflection.

1. System Environments for Autonomous Vehicles

FIG. 1 is a block diagram illustrating an example of a system environment for autonomous vehicles according to some implementations. FIG. 1 depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1 can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 5:
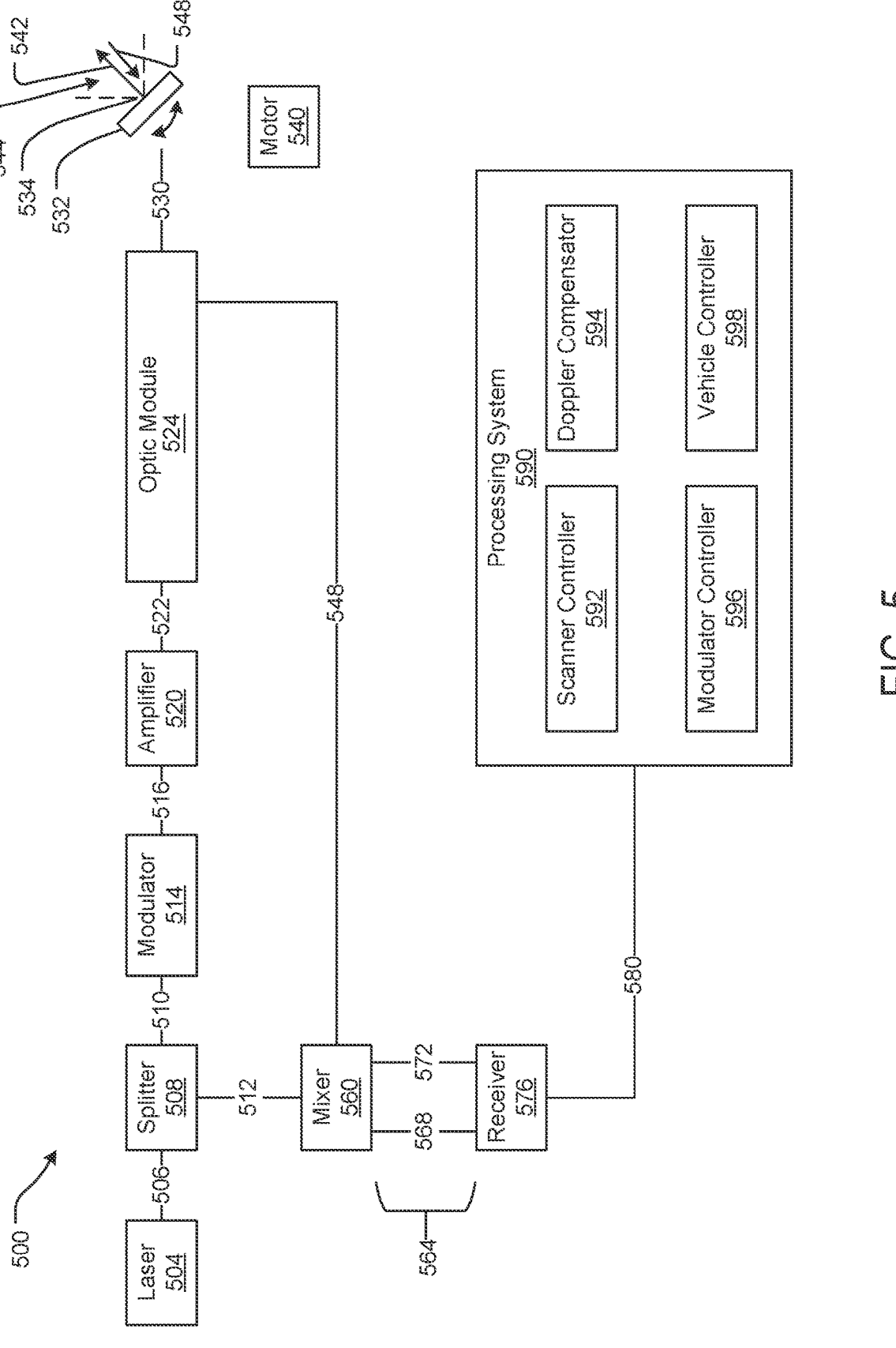
FIG. 5 is a block diagram of an example of a LIDAR sensor system.

A truck can include a LIDAR system (e.g., vehicle control system 120 in FIG. 1, LIDAR sensor system 500 in FIG. 5, among others described herein). In some implementations, the LIDAR sensor system 500 can use frequency modulation to encode an optical signal and scatter the encoded optical signal into free-space using optics. By detecting the frequency differences between the encoded optical signal and a returned signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectively object beyond 300 meters, and a high reflectivity object beyond 400 meters.

To achieve such improvements in detection capability, the FM LIDAR sensor system may use sensors (e.g., sensors 130 in FIG. 1). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this "noise."

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

2.1 Commercial Trucking

Figure 2:
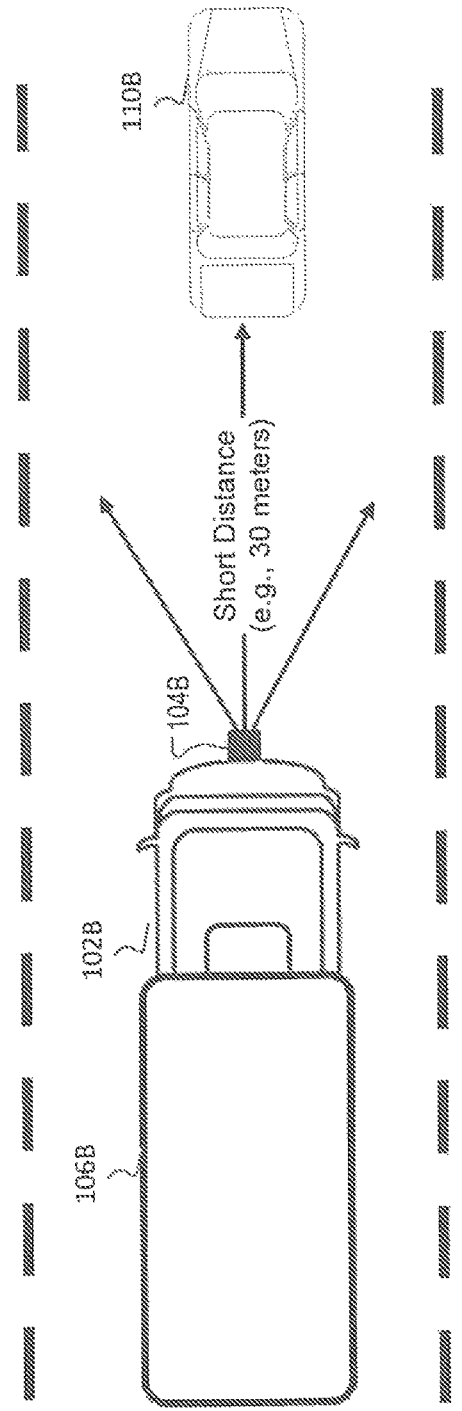
FIG. 2 is a block diagram of an example of a system environment for autonomous commercial trucking vehicles.

FIG. 2 is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 2 as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1, LIDAR sensor system 500 in FIG. 5) for determining a distance to the object 110B and/or measuring the velocity of the object 110B. Although FIG. 2 shows that one LIDAR sensor system 104B is mounted on the front of the commercial truck 102B, the number of LIDAR sensor system and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 3:
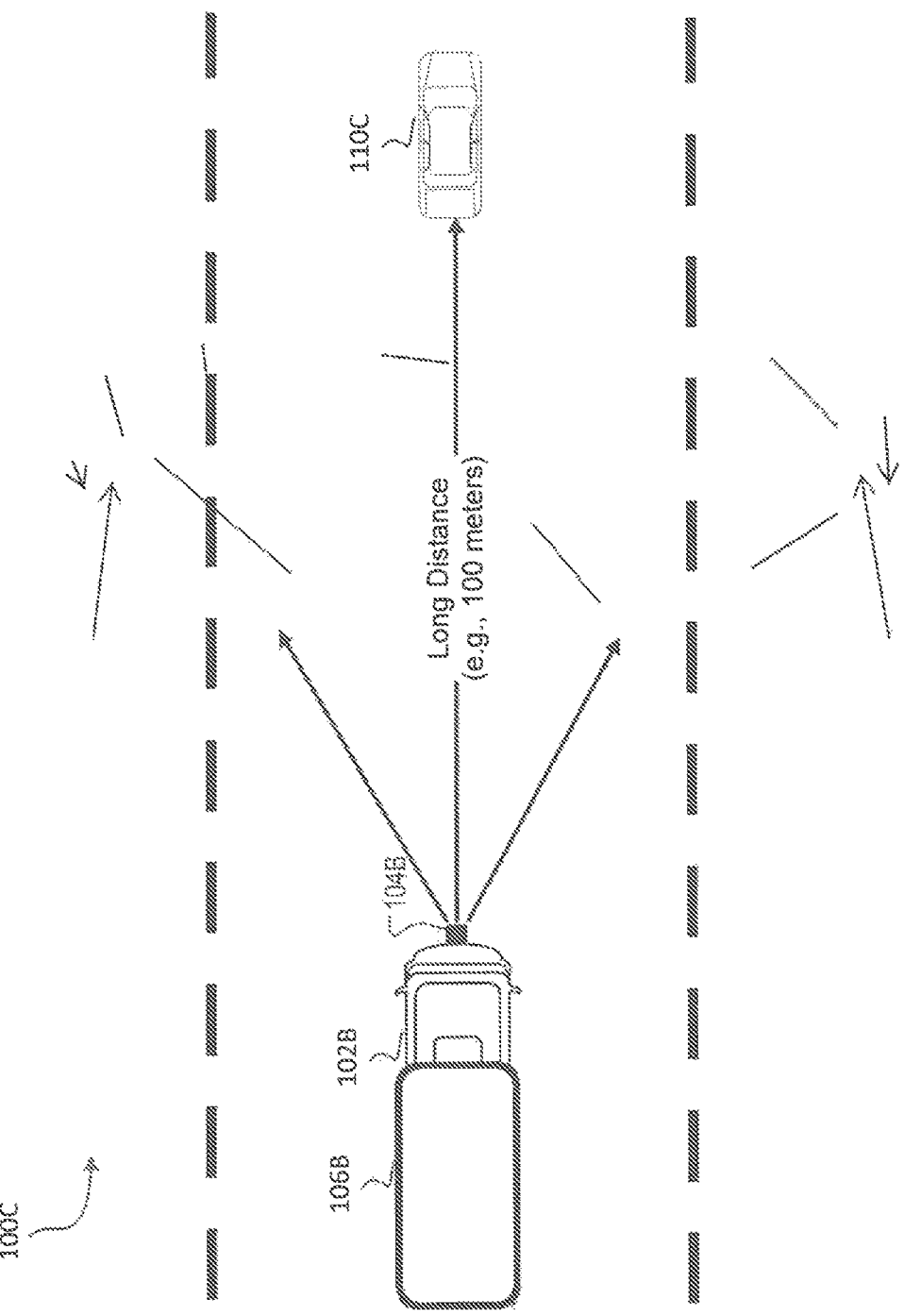
FIG. 3 is a block diagram of an example of a system environment for autonomous commercial trucking vehicles.

FIG. 3 is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 3 as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 4:
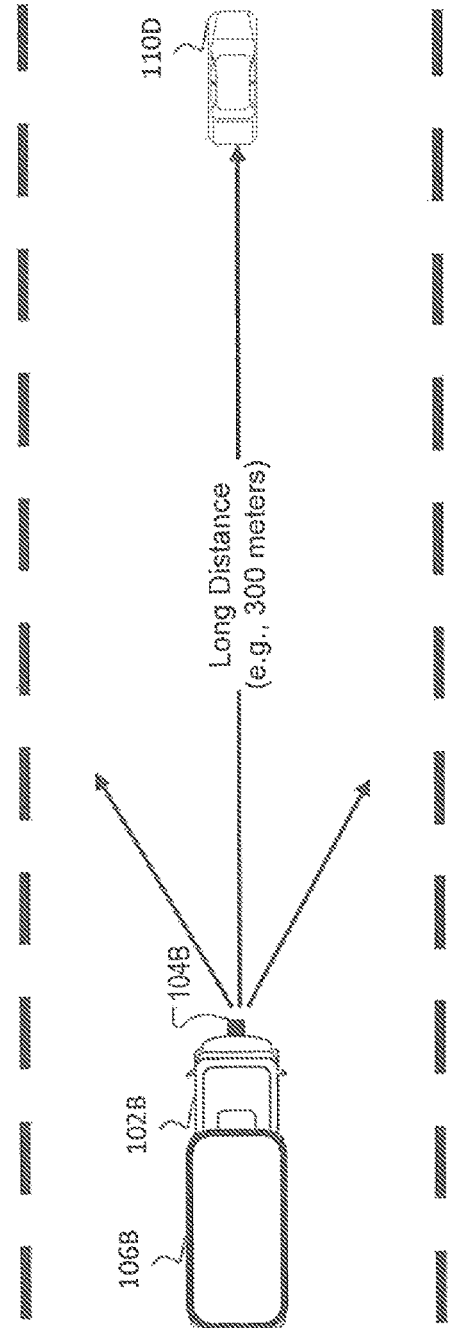
FIG. 4 is a block diagram of an example of a system environment for autonomous commercial trucking vehicles.

FIG. 4 is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 4 as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

3. LIDAR Sensor Systems

FIG. 5 depicts an example of a LIDAR sensor system 500. The LIDAR sensor system 500 can be used to determine parameters regarding objects, such as range and velocity, and output the parameters to a remote system. For example, the LIDAR sensor system 500 can output the parameters for use by a vehicle controller that can control operation of a vehicle responsive to the received parameters (e.g., vehicle controller 598) or a display that can present a representation of the parameters. The LIDAR sensor system 500 can be a coherent detection system. The LIDAR sensor system 500 can be used to implement various features and components of the systems described with reference to FIGS. 1-4. The LIDAR sensor system 500 can include components for performing various detection approaches, such as to be operated as an amplitude modular LIDAR system or a coherent LIDAR system. The LIDAR sensor system 500 can be used to perform time of flight range determination. In some implementations, various components or combinations of components of the LIDAR sensor system 500, such as laser source 504 and modulator 514, can be in a same housing, provided in a same circuit board or other electronic component, or otherwise integrated. In some implementations, various components or combinations of components of the LIDAR sensor system 500 can be provided as separate components, such as by using optical couplings (e.g., optical fibers) for components that generate and/or receive optical signals, such as light beams, or wired or wireless electronic connections for components that generate and/or receive electrical (e.g., data) signals. Various components of the LIDAR sensor system 500 can be arranged with respect to one another such that light (e.g., beams of light) between the components is directed through free space, such as a space provided by an air (or vacuum) gap, a space that is not through an optical fiber, a space that is free of structural components around a path along which the light is directed (e.g., an empty space at least on the order of millimeters away from a direct line path between the components; an empty space of a size greater than an expected beam width of the light, such as where the light is a collimated beam), or various combinations thereof.

The LIDAR sensor system 500 can include a laser source 504 that generates and emits a beam 506, such as a carrier wave light beam. A splitter 508 can split the beam 506 into a beam 510 and a reference beam 512 (e.g., reference signal). In some implementations, any suitable optical, electronic, or opto-electronic elements can be used to provide the beam 510 and the reference beam 512 from the laser source 504 to other elements.

A modulator 514 can modulate one or more properties of the input beam 510 to generate a beam 516 (e.g., target beam). In some implementations, the modulator 514 can modulate a frequency of the input beam 510 (e.g., optical frequency corresponding to optical wavelength, where $c=\lambda v$, where c is the speed of light, $\lambda$ is the wavelength, and v is the frequency). For example, the modulator 514 can modulate a frequency of the input beam 510 linearly such that a frequency of the beam 516 increases or decreases linearly over time. As another example, the modulator 514 can modulate a frequency of the input beam 510 non-linearly (e.g., exponentially). In some implementations, the modulator 514 can modulate a phase of the input beam 510 to generate the beam 516. However, the modulation techniques are not limited to the frequency modulation and the phase modulation. Any suitable modulation techniques can be used to modulate one or more properties of a beam. Returning to FIG. 5, the modulator 514 can modulate the beam 510 subsequent to splitting of the beam 506 by the splitter 508, such that the reference beam 512 is unmodulated, or the modulator 514 can modulate the beam 506 and provide a modulated beam to the splitter 508 for the splitter 508 to split into a target beam and a reference beam.

The beam 516, which is used for outputting a transmitted signal, can have most of the energy of the beam 506 outputted by the laser source 504, while the reference beam 512 can have significantly less energy, yet sufficient energy to enable mixing with a return beam 548 (e.g., returned light) scattered from an object. The reference beam 512 can be used as a local oscillator (LO) signal. The reference beam 512 passes through a reference path and can be provided to a mixer 560. An amplifier 520 can amplify the beam 516 to output a beam 522.

The LIDAR sensor system 500 can include an optic module 524 (e.g., optical module), which can receive the beam 522. The optic module 524 can be a free space optic. For example, the optic module 524 can include one or more optics (e.g., lenses, mirrors, waveguides, grating couplers, prisms, waveplates) arranged to have a gap (e.g., air gap) between the one or more optics, allowing for free space transmission of light (e.g., rather than all light being coupled between optics by fibers). The optic module 524 can perform functions such as collimating, filtering, and/or polarizing the beam 522 to output a beam 530 to optics 532 (e.g., scanning optics).

Figure 6:
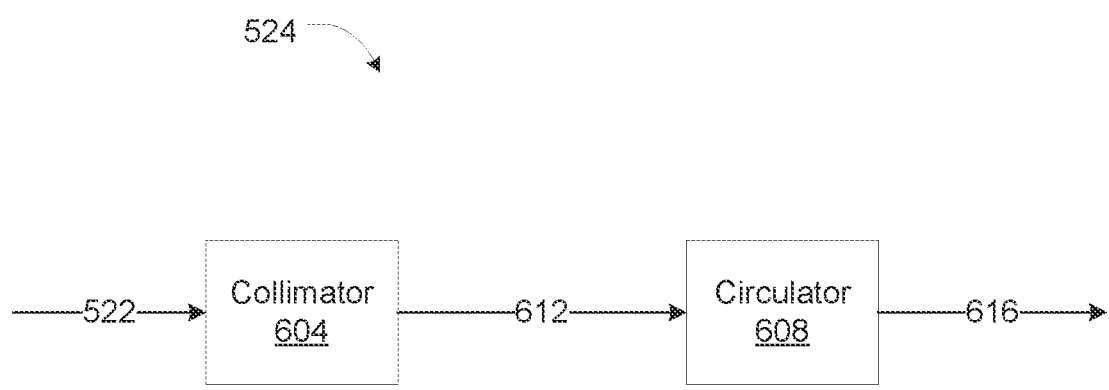
FIG. 6 is a block diagram of an example of an optic module of a LIDAR sensor system.

Referring to FIG. 6, the optic module 524 can include at least one collimator 604 and at least one circulator 608. For example, the circulator 608 can be between the collimator 604 and the optics 532 of FIG. 5. The circulator 608 can receive a collimated beam 612 outputted by the collimator 604 and output a beam 616 (e.g., the beam 530 depicted in FIG. 5) to the optics 532. In some implementations, the circulator 608 can be between the laser source 504 and the collimator 604. At least one of the collimator 604 or the circulator 608 can be free space optics (and can be coupled with one another in free space), such as by being optically coupled via air gaps rather than optical fibers.

Referring further to FIG. 5, the optic module 524 can receive return beam 548 from the optics 532 and provide the return beam 548 to the mixer 560. The optics 532 can be scanning optics, such as one or more steering mirrors or polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 532 can define a field of view 544 that corresponds to angles scanned (e.g., swept) by the beam 542 (e.g., a transmitted beam). For example, the beam 542 can be scanned in the particular plane, such as an azimuth plane or elevation plane (e.g., relative to an object to which the LIDAR sensor system 500 is coupled, such as an autonomous vehicle). The optics 532 can be oriented so that the field of view 544 sweeps an azimuthal plane relative to the optics 532.

At least one motor 540 can be coupled with the optics 532 to control at least one of a position or an orientation of the optics 532 relative to the beam 530. For example, where the optics 532 include a mirror, reflector, or deflector, the motor 540 can rotate the optics 532 relative to an axis 534 (e.g., an axis orthogonal to the frame of reference depicted in FIG. 5) so that surfaces of the optics 532 at which the beam 530 is received vary in angle or orientation relative to the beam 530, causing the beam 542 to be varied in angle or direction as the beam 542 is outputted from the optics 532.

The beam 542 can be outputted from the optics 532 and reflected or otherwise scattered by an object (not shown) as a return beam 548 (e.g., return signal). The return beam 548 can be received on a reception path, which can include the circulator 608, and provided to the mixer 560.

The mixer 560 can be an optical hybrid, such as a 90 degree optical hybrid. The mixer 560 can receive the reference beam 512 and the return beam 548, and mix the reference beam 512 and the return beam 548 to output a signal 564 responsive to the reference beam 512 and the return beam 548. The signal 564 can include an in-phase (I) component 568 and a quadrature (Q) component 572.

The LIDAR sensor system 500 can include a receiver 576 that receives the signal 564 from the mixer 560. The receiver 576 can generate a signal 580 responsive to the signal 564, which can be an electronic (e.g., radio frequency) signal. The receiver 576 can include one or more photodetectors that output the signal 580 responsive to the signal 564.

The LIDAR sensor system 500 can include a processing system 590, which can be implemented using features of the vehicle control system 120 described with reference to FIG. 1. The processing system 590 can process data received regarding the return beam 548, such as the signal 580, to determine parameters regarding the object such as range and velocity. The processing system 590 can include a scanner controller 592 that can provide scanning signals to control operation of the optics 532, such as to control the motor 540 to cause the motor 540 to rotate the optics 532 to achieve a target scan pattern, such as a sawtooth scan pattern or step function scan pattern. The processing system 590 can include a Doppler compensator 594 that can determine the sign and size of a Doppler shift associated with processing the return beam 548 and a corrected range based thereon along with any other corrections. The processing system 590 can include a modulator controller 596 that can send one or more electrical signals to drive the modulator 514.

The processing system 590 can include or be communicatively coupled with a vehicle controller 598 to control operation of a vehicle for which the LIDAR sensor system 500 is installed (e.g., to provide complete or semi-autonomous control of the vehicle). For example, the vehicle controller 598 can be implemented by at least one of the LIDAR sensor system 500 or control circuitry of the vehicle. The vehicle controller 598 can control operation of the vehicle responsive to at least one of a range to the object or a velocity of the object determined by the processing system 590. For example, the vehicle controller 598 can transmit a control signal to at least one of a steering system or a braking system of the vehicle to control at least one of speed or direction of the vehicle.

3.1 LIDAR Sensor System Using Polarization

Figure 7:
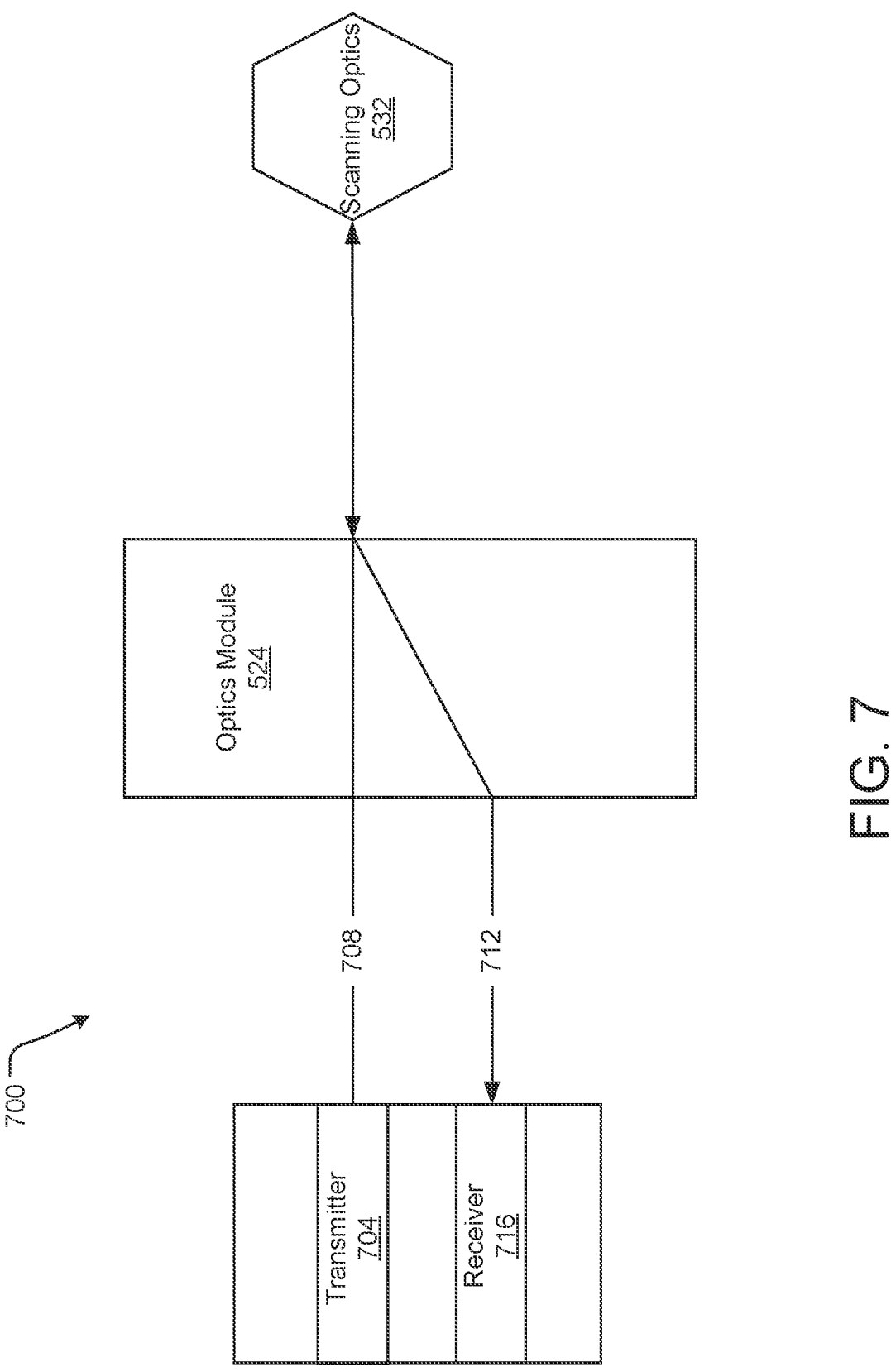
FIG. 7 is a block diagram of an example of a LIDAR sensor system.

FIG. 7 depicts a block diagram of an example of a LIDAR sensor system 700. The LIDAR sensor system 700 can incorporate features of the LIDAR sensor system 500 described with reference to FIG. 5. The LIDAR sensor system 700 can output a transmit beam having a particular polarization, such as linear polarization, and include various optics so that signals corresponding to the transmit beam are more effectively directed through the LIDAR sensor system 700, enabling the LIDAR sensor system 700 to more effectively provide output signals and/or determine parameters based on the return beam to the LIDAR sensor system 700. For example, the particular polarization can be less susceptible to unintended phase changes that would otherwise result from interaction with scanning optics (e.g., polygon mirrors) depending on the angle of incidence on the scanning optics. This can allow for the use of protected gold coatings (instead of unprotected gold coatings, which can be more difficult to use in manufacturing the scanning optics), and/or allow for coatings to be optimized or otherwise targeted to the particular polarization, which can decrease unintended reflections and increase transmission of intended signals to improve signal-to-noise ratio. For example, protected coatings and/or dielectric coatings can be used instead of unprotected gold. In addition, back reflection of the transmit beam from the scanning optics back into the circulator or other components of the LIDAR sensor system (instead of being transmitted out into the environment) can be reduced, improving signal-to-noise ratio and/or obviating the need for complex calculations to address back reflections, particularly where such back reflections are Doppler shifted.

In some instances, linearly polarized transmit signals may also be more likely to be reflected by targets in a polarization maintaining manner (e.g., expected targets for use in the autonomous vehicle context may be more likely to reflect or otherwise scatter linearly polarized transmit signals as linearly polarized return signals than would be expected for transmit signals of other polarizations). Signal-to-noise ratio and probability of detection (PoD) (i.e., a measure of lidar measurements that satisfy a performance threshold, such as a performance threshold associated with signal to noise ratio) can also be improved at horizontal (i.e., azimuthal) edges of the field of view.

The LIDAR sensor system 700 can include at least one transmitter 704 and at least one receiver 716. In some implementations, an integrated module or an integrated chip can include both a transmitter and a receiver. In other implementations, a transmitter and a receiver can be implemented as separate modules or chips. Referring back to FIG. 7, the transmitter 704 can be an optical fiber, a grating, such as a grating coupler, or a waveguide. For example, the transmitter 704 can include an array of optical fibers, an array of grating couplers, or an array of waveguides. The grating couplers can be structures having a plurality of spaced apart channels, such as parallel channels, which may have various shapes of the same or differing sizes. The grating coupler can be a structure formed by etching on a substrate, such as a chip. The grating coupler can be a structure formed by deposition of material on the chip.

The transmitter 704 can receive a beam and output beam 708. For example, the transmitter 704 can receive the beam 522 described with reference to FIG. 5 (or various other beams between laser 504 and scanning optics 532) and output the beam 708.

The transmitter 704 can direct the beam 708 to the optic module 524 which, as described with reference to FIG. 6, can be used to perform collimator and/or circulator operations. The optic module 524 can direct the beam 708 to the scanning optics 532. The scanning optics 532 can receive a return beam 712 from reflection or scattering of the beam 708 by a target (e.g., object), which the optic module 524 can provide to at least one receiver 716.

The receiver 716 can be an optical fiber, a grating (e.g., a grating coupler), or a waveguide. The receiver 716 can be an array of receivers 716. The receiver 716 can receive the return beam 712 and direct the return beam 712 to detector components (e.g., one or more photodetectors), which can output an electrical signal based on the return beam 712.

Figure 8:
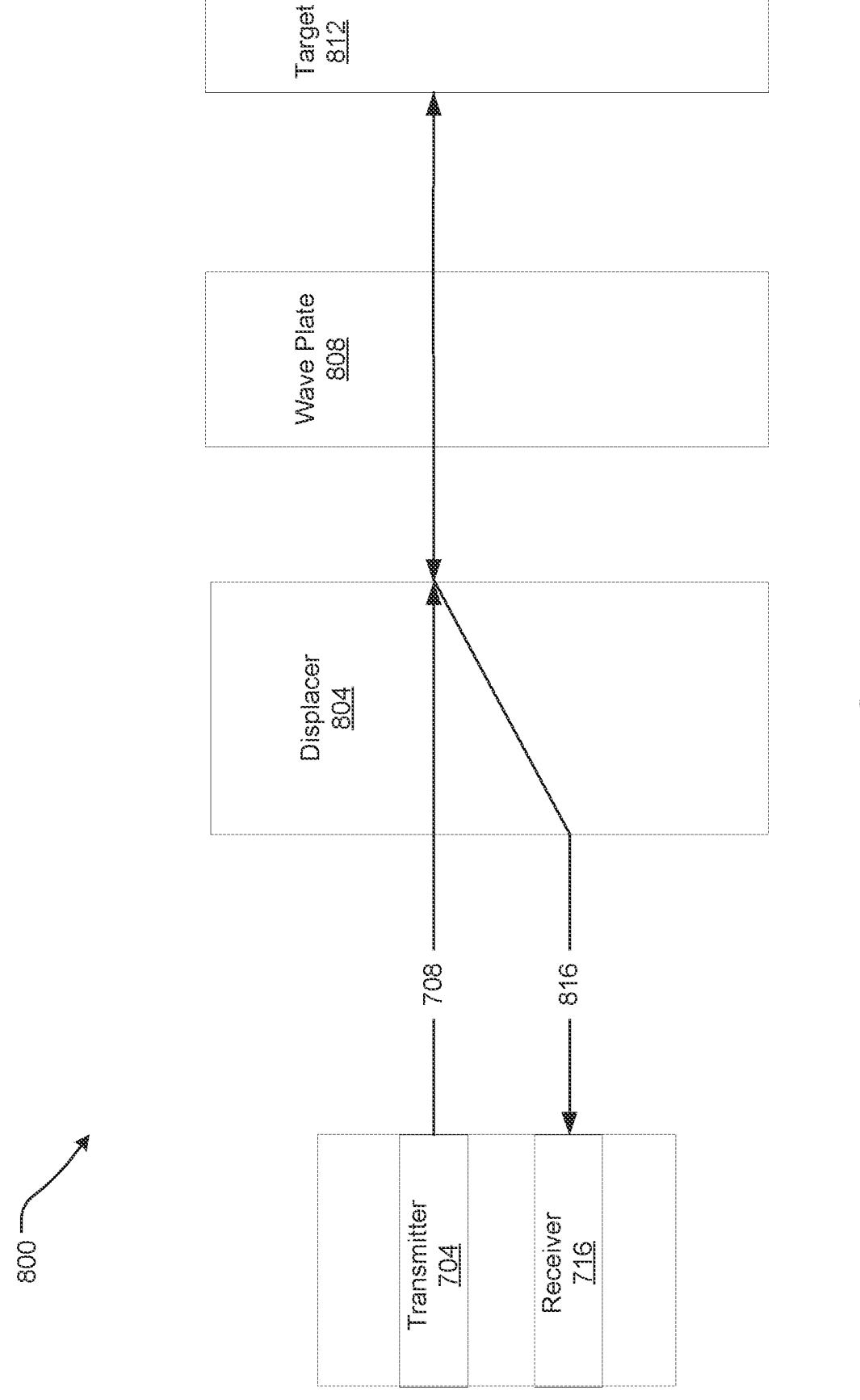
FIG. 8 is a block diagram of an example of an optical system.

FIG. 8 depicts an example of an optical system 800, which can be used to implement features of various LIDAR sensor systems described herein, such as the LIDAR sensor systems 500, 700, or the optic module 524. For example, displacer 804 and wave plate 808 can be used to implement a circulator (e.g., circulator 608) to direct beams between transmitter 704, scanning optics 532, and receiver 716 as described with reference to FIG. 7. The optical system 800 can enable a return beam to be received and separated from a transmit beam using relatively few components and with precise alignment of the return beam to the receiver 716.

As shown in FIG. 8, the optical system 800 includes a displacer 804 between the transmitter 704 and a target 812 (e.g., an object in the environment, with scanning optics 532 between the displacer 804 and the target 812). The displacer 804 can be an optic made from a birefringent material, such as a birefringent crystal. For example, the displacer 804 can be made from materials such as calcite, quartz, lithium niobate, or yttrium orthovanadate (YVO$_4$) materials. The displacer 804, due to being made from birefringent material (and an orientation of an optical axis of the displacer 804 relative to axes along which beams pass through the displacer 804) can split an unpolarized input beam into two beams of orthogonal polarizations, the two beams displaced relative to one another. As depicted in FIG. 8, the beam 708 has linear polarization, and thus the displacer 804 does not split or displace a component of the beam 708 relative to the axis along which the beam 708 passes from the transmitter 704 to the displacer 804.

The optical system 800 includes a wave plate 808 between the displacer 804 and the target 812. The wave plate 808 can be made of a birefringent material, such as quartz or plastic, for which the index of refraction can be different for various polarizations of light along at least one particular axis through the material. The wave plate 808 can be a quarter wave plate, such that the wave plate 808 converts the polarization of the beam 708 from linear polarization to circular polarization as the beam 708 is outputted towards the target 812.

The optical system 800 can receive a return beam 816 from reflection or other scattering of the beam 708 by the target 812 (e.g., via scanning optics 532). For example, at least a portion of the beam 708, responsive to be reflected by the target 812, can be returned as the return beam 816 having circular polarization of an opposite handedness as that of the beam 708 (e.g., clockwise vs. counterclockwise handedness). The wave plate 808 can receive the return beam 816 (of circular polarization) and convert the polarization of the return beam 816 from circular polarization to linear polarization.

Due to the opposite direction of the return beam 816 as it is received by the displacer 804 (i.e., relative to the optical axis of the displacer 804), the displacer 804 can displace the return beam 816 away from the path along which the beam 708 travels. As such, the return beam 816 can be directed to the receiver 716 along a separate path from which the beam 708 is transmitted, facilitating improved signal-to-noise-ratio.

Figure 9:
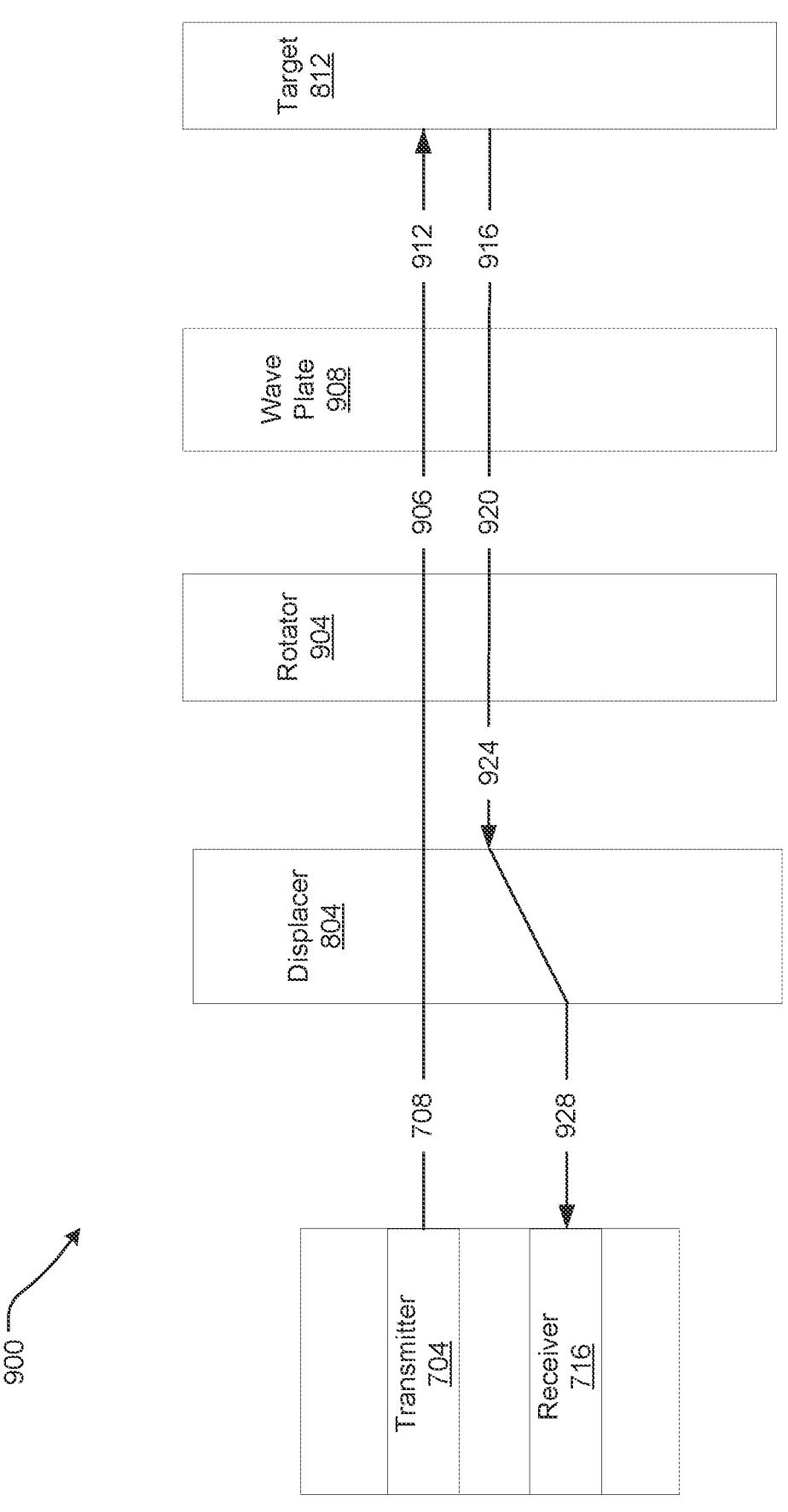
FIG. 9 is a block diagram of an example of an optical system.

FIG. 9 depicts an example of an optical system 900. The optical system 900 can incorporate features of the optical system 800, and be implemented to control a magneto-optic effect (e.g., Faraday rotation) to more effectively rely on a particular polarization, such as linear polarization, of the light used by the optical system 900, such as to avoid the need for unprotected gold coatings on scanning optics and/or use coatings targeted to or optimized for the particular polarization.

The optical system 900 can include an optical rotator 904, which can be a Faraday isolator or Faraday rotator (e.g. the component 904 can be a Faraday rotator, and operate as an optical isolator together with one or both of displacer 804 and wave plate 908). For example, the rotator 904 can be configured to output a magnetic field to apply a particular rotation to the light passing through the rotator 904 based on factors relating to the material and shape of the rotator 904, such as the Verdet constant, magnetic flux (in the direction by which the light passes through the rotator 904), and length of the rotator 904 (along the direction by which the light passes through the rotator 904). The rotator 904 can be made from a rare earth magnet, such as a rare earth magnet configured to perform the particular rotation of light at a target wavelength or range of wavelengths of light used by the optical system 900, such as wavelengths at or about 1550 nm. For example, the rotator 904 can be made from bismuth iron garnet (BIG).

The rotator 904 can be configured to apply the particular rotation to be 45 degrees or about 45 degrees. For example, the rotator 904 can rotate light (e.g., beam 708) by 45 degrees in one direction through the rotator 904 (e.g., in the transmit direction from transmitter 704 towards target 812) and then an additional 45 degrees in the opposite direction through the rotator 940 (e.g., in the receive direction from the target 812 towards the receiver 716), enabling a total of 90 degrees rotation to be applied to the polarization state of the light being operated on by the optical system 900.

The rotator 904 can be between the displacer 804 and a wave plate 908, to receive the beam 708 from the displacer 804 and output a beam 906 to the wave plate 908. The rotator 904 can be configured to apply the particular rotation, such as 45 degree rotation, to the beam 708 to output beam 906. For example, the beam 708 can have a linear polarization, and the rotator 904 can rotate the linear polarization by 45 degrees.

The wave plate 908 can be a half wave plate, so that the wave plate 908 applies a rotation of 45 degrees to the polarization of the beam 906, in an opposite direction of the rotation applied by the rotator 904. As such, the wave plate 908 can output a beam 912 having a same linear polarization as that of the beam 708, which can be directed towards the target 812 (e.g., by scanning optics 532).

The wave plate 908 can receive a return beam 916 from reflection or other scattering of the beam 912 by the target 812. Receiving the beam 912 in the opposite direction as the beam 906 is received, the wave plate 908 can apply a 45 degree rotation to the polarization of the beam 906 to output a beam 920 to the rotator 904. The rotator 904 can apply a 45 degree rotation to the polarization of the beam 920, in the same direction as the rotation applied by the wave plate 908 to the beam 912, to output a beam 924 having a polarization rotated 90 degrees relative to the (linear) polarization of the beam 708. As such, the displacer 804 can split the beam 924 out of the path of the beam 708 to be directed as beam 928 to the receiver 716.

Figure 10:
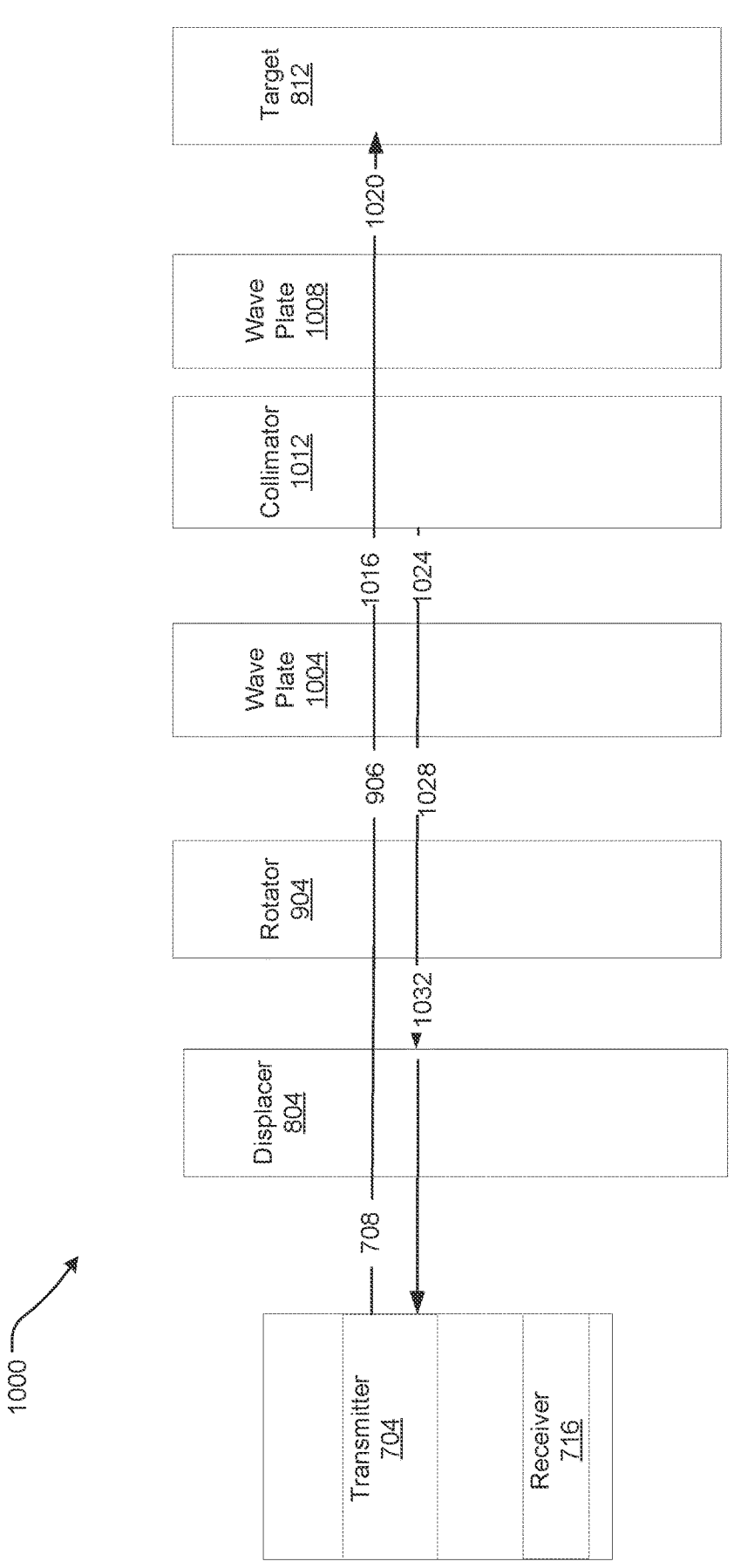
FIG. 10 is a block diagram of an example of an optical system.

FIG. 10 depicts an example of an optical system 1000. The optical system 1000 can incorporate features of the optical system 900, including the displacer 804 and rotator 904. The optical system 1000 can be used to align back reflections with the transmission path, rather than the receive path to receiver 716. In particular, FIG. 10 depicts the alignment of signals back-reflected by collimation optics (e.g., collimator 1012), which are controlled to be kept separate from the receive path to the receiver 716.

For example, as compared to the half wave plate 908 of the optical system 900, the optical system 1000 can include wave plates 1004, 1008, implemented as quarter wave plates. The optical system 1000 can include a collimator 1012 between the wave plates 1004, 1008.

As depicted in FIG. 10, the transmitter 704 can output the beam 708 which, having linear polarization, passes through the displacer 804. The rotator 904 receives the beam 708 and applies the 45 degree rotation to the polarization of the beam 708 to output the beam 906.

The quarter wave plate 1004 receives the beam 906 and applies a polarization change to the beam 906 to cause the beam 906 to be outputted as beam 1016 which can have, for example, circular polarization. The beam 1016 can be collimated by collimator 1012. The wave plate 1008 can apply a polarization change to the collimated beam 1016 to output a beam 1020 to be directed to the target 812. The beam 1020 can have, for example, linear polarization (e.g., a same polarization as beam 912 described with reference to FIG. 9, as well as the beam 708, due to the polarization changes applied by the wave plates 1004, 1008 and the rotator 904 in the transmit direction). A return beam (not shown) can be received from reflection of the beam 1020 by the target 812, and split by the displacer 804 to be directed to the receiver 716 due to polarization changes applied on the receive path by the wave plates 1004, 1008 and rotator 904.

Referring further to FIG. 10, a reflected beam 1024 (e.g., back-reflected beam) is reflected by the collimator 1012, and thus has the opposite polarization of the beam 1016. For example, the beams 1016, 1024 can have circular polarization of opposite directions. As such, the wave plate 1004 can apply a rotation to the polarization of the beam 1024 that is reciprocal to that applied to the beam 1016 to output a beam 1028. The rotator 904 can further rotate the beam 1028 to output a beam 1032 having the same polarization as the beam 708, allowing the displacer 804 to be directed separately from the receive path to the receiver 716. As such, the combination of the wave plates 1004, 1008 and phase shift from reflection by the collimator 1012 can cause ninety degrees of polarization rotation, which combined with the net rotation of ninety degrees from the rotator 904 (forty-five degrees forward and reverse) can result in the beam 132 remaining aligned with the beam 708 and crossed (e.g., in polarization) with the return beam.

Figure 11:
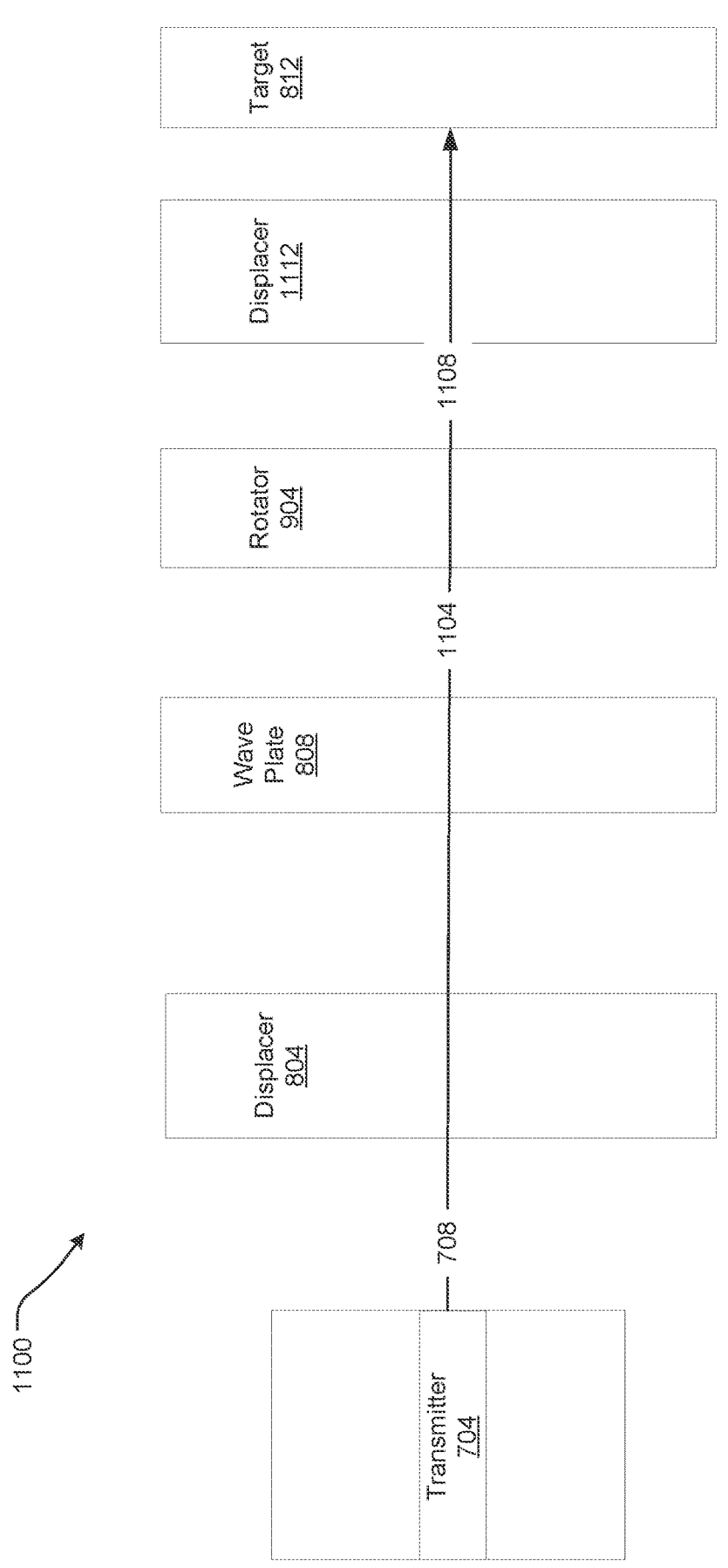
FIG. 11 is a block diagram of an example of an optical system and beam transmission along a transmit path of the optical system.
Figure 12:
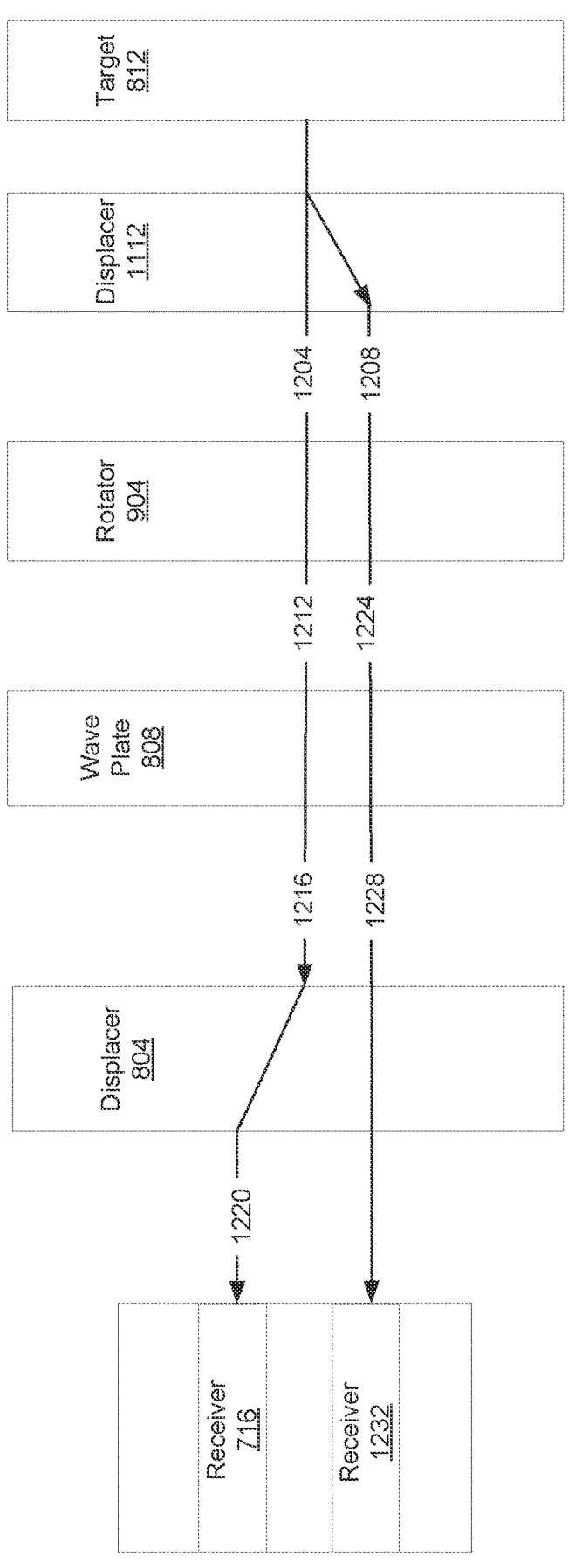
FIG. 12 is a block diagram of an example of an optical system and beam transmission along a receive path of the optical system.

FIGS. 11 and 12 depict an example of an optical system 1100. The optical system 1100 can incorporate features of various optical systems or modules described herein, such as the optical system 800, and be implemented to use multiple polarizations to more effectively capture portions of the transmitted beam 708 that may not necessarily by reflected or scattered by the target 812 with the same polarization as the transmitted beam 708. For example, light of the beam 708 that is depolarized by the target 812 can be captured. In addition, by being able to capture light of multiple polarizations, such as dual polarizations, the optical system 1100 can more effectively account for phase shifts or other unintended effects on the beam 708 caused by the scanning optics 532. This can obviate the need for particular coatings, such as unprotected gold coatings, on the scanning optics 532.

FIG. 11 depicts a transmission path of the optical system 1100. The optical system 1100 includes the displacer 804. The displacer 804 can receive the beam 708 from the transmitter 704. Based on the particular polarization of the beam 708, such as linear polarization, the beam 708 can pass through the displacer 804 to the wave plate 808.

The optical system 1100 includes the wave plate 808. The displacer 804 can be between the transmitter 704 and the wave plate 808. The wave plate can be implemented as a half wave plate. As such, the wave plate 808 can apply a rotation of 45 degrees (e.g., negative 45 degrees) to the polarization of the beam 708 to output a beam 1104.

The optical system 1100 includes the rotator 904. The wave plate 808 can be between the displacer 804 and the rotator 904. The rotator 904 can receive the beam 1104 and apply a 45 degree rotation in an opposite direction as that applied by the wave plate 808 (e.g., positive 45 degrees) to the polarization of the beam 1104 to output a beam 1108, such that the beam 1108 has the same polarization as the beam 708.

The optical system 1100 can include a displacer 1112, which can be a second displacer 1112 in addition to the displacer 804. The displacer 1112 can be similar or identical to the displacer 1112. As depicted in FIG. 11, due to the linear polarization of the beam 1108, the beam 1108 can pass through the displacer 1112 without a change in polarization or a displacement. The beam 1108 can be directed into the environment (e.g., via scanning optics 532), such as to be reflected or otherwise scattered by the target 812.

FIG. 12 depicts the receive path, or return path, through the optical system 1100. A return beam 1204 from reflection or other scattering of the beam 1108 by the target 812 is received at the displacer 1112. The return beam 1204 can be unpolarized, such as being substantially unpolarized (e.g., as compared with lesser portions of the beam 1108 that may be reflected in a polarized state).

The displacer 1112 can receive the beam 1204 and split the beam 1204 into a first component (shown as the beam 1204) and a second component (shown as the beam 1208). For example, the displacer 1112 can split the beam into the first component, the first component having a first polarization, and the second component, the second component having a second polarization orthogonal to the first polarization. The displacers 1112 can output the beams 1204, 1208 of the respective first and second components to be spaced apart.

The rotator 904 applies a rotation to the polarization of the beam 1204 to output a beam 1212. For example, the rotator 904 can apply a rotation of 45 degrees (e.g., positive 45 degrees) to the polarization of the beam 1204 to output the beam 1212.

The half wave plate 808 can apply a rotation of 45 degrees (e.g., positive 45 degrees) to the polarization of the beam 1212 to output a beam 1216, which is directed to the displacer 804. As depicted in FIG. 12, the beam 1216, having a polarization rotated 90 degrees relative to the polarization of the transmit beam 708, can be displaced from the transmission path to be received at receiver 716.

Referring further to FIG. 12, the beam 1208 (displaced from the transmission path along which the beam 1204 passes) is received at the rotator 904. The rotator 904 applies a rotation of 45 degrees to the beam 1208 to output a beam 1224, which can thus have a polarization orthogonal to that of the beam 1212 (similar to the beams 1204, 1208 having orthogonal polarizations).

The beam 1224 is received at the wave plate 808. The wave plate 808 can apply a rotation of 45 degrees (e.g., positive 45 degrees) to the polarization of the beam 1224 to output a beam 1228, which is directed to the displacer 804. As compared with the beam 1216, the beam 1228 can have the same polarization as the beam 708 (e.g., linear polarization), and pass through the displacer 804 (e.g., without being split or displaced) to a receiver 1232. The receiver 1232 can be similar or identical to the receiver 716.

As such, the optical system 1100 can receive light of more polarization states, such as to collect more light reflected or otherwise scattered by the target 812, and direct the received light to the receivers 716, 1232 for further optical and/or electronic processing. Further, by using linearly polarized light for the transmitted beam 708, the optical system 1100 can avoid phase shifting that could otherwise be caused by scanning optics.

In some implementations, the optical system 1100 can be configured to account for lag associated with time-of-flight of the transmit and return beams. For example, after light outputted by the optical system 1100 has travelled 300 meters and back to the optical system 1100, the optical system 1100 can have moved or rotated on the order of 0.01 degrees, such that the light to be received at receivers 716, 1232 can be offset from the receivers 716, 1232. At least one of the displacers 804, 1112 can be at least one of rotated or tilted (e.g., relative to the transmission path along which the beam 708 is outputted) to reduce the offset for a target distance (i.e., range) or range of distances for detecting objects, such as to increase a maximum range of the optical system 1100.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) sensor system, comprising:
   a transmitter configured to output a beam having a linear polarization;
   one or more scanning optics;
   an optical module configured to provide the beam to the one or more scanning optics, the one or more scanning optics configured to output the beam received from the optical module, wherein the optical module comprises:
   a displacer configured to displace a path of a return beam relative to a path along which the beam from the transmitter passes through the displacer;
   a first wave plate configured to adjust the polarization of the beam;
   a second wave plate configured to adjust the polarization of the beam;
   a collimator located between the first wave plate and the second wave plate, the collimator configured to collimate the beam outputted by the first wave plate; and
   a Faraday rotator located between the displacer and the first wave plate, the Faraday rotator configured to output a magnetic field to adjust the polarization of the beam; and
   a receiver spaced from the transmitter on an integrated chip including both the transmitter and the receiver, the receiver configured to receive the return beam from reflection of the beam by an object.

2. The LIDAR sensor system of claim 1, wherein:
   the return beam configured for receipt by the receiver has the linear polarization; and
   the linear polarization of the beam output by the transmitter, the linear polarization of the return beam, and arrangement of the receiver spaced from the transmitter on the integrated chip are configured to improve signal-to-noise ratio of the LIDAR sensor system compared with circularly polarized light.

3. The LIDAR sensor system of claim 1, wherein the displacer comprises a birefringent crystal configured to displace the path of the return beam based on a polarization of the return beam.

4. The LIDAR sensor system of claim 1, wherein the first wave plate and the second wave plate comprise a quarter wave plate configured to adjust the polarization of the beam from linear polarization to circular polarization.

5. The LIDAR sensor system of claim 1, wherein the first wave plate and the second wave plate rotate a polarization of the beam by 45 degrees.

6. The LIDAR sensor system of claim 5, wherein the Faraday rotator rotates the polarization of the beam by 45 degrees.

7. The LIDAR sensor system of claim 6, wherein the Faraday rotator rotates the polarization of the beam in an opposite direction than the first wave plate and the second wave plate.

8. The LIDAR sensor system of claim 1, wherein the scanning optics comprise a protected gold coating.

9. The LIDAR sensor system of claim 1, wherein the receiver is a first receiver, the LIDAR sensor system comprises a second receiver spaced from the first receiver, and the optical module comprises:

a first displacer;
a wave plate;
a second displacer; and
a Faraday rotator located between the wave plate and the second displacer;
wherein the first displacer is located between the transmitter and the wave plate and is configured to provide a first component of the return beam to the first receiver and a second component of the return beam to the second receiver, the wave plate is configured to adjust the polarization of the beam, the first component, and the second component, the Faraday rotator is configured to output a magnetic field to adjust the polarization of the beam, the first component, and the second component, and the second displacer is configured to split the return beam into the first component and the second component.

10. The LIDAR sensor system of claim 1, wherein the optical module comprises a circulator configured to adjust the polarization of the beam and a collimator configured to collimate the beam.

11. An autonomous vehicle control system, comprising:
a transmitter configured to output a beam having a linear polarization;
one or more scanning optics;
an optical module configured to provide the beam to the one or more scanning optics, the one or more scanning optics configured to output the beam received from the optical module, wherein the optical module comprises:
a displacer configured to displace a path of a return beam relative to a path along which the beam from the transmitter passes through the displacer;
a first wave plate configured to adjust the polarization of the beam;
a second wave plate configured to adjust the polarization of the beam;
a collimator located between the first wave plate and the second wave plate, the collimator configured to collimate the beam outputted by the first wave plate; and a Faraday rotator located between the displacer and the first wave plate, the Faraday rotator configured to output a magnetic field to adjust the polarization of the beam;
a receiver spaced from the transmitter on an integrated chip including both the transmitter and the receiver, the receiver configured to receive the return beam from reflection of the beam by an object; and
one or more processors configured to:
determine at least one of a range to the object or a velocity of the object based on the beam; and
control operation of at least one of a steering system of an autonomous vehicle or a braking system of the autonomous vehicle responsive to the at least one of the range or the velocity.

12. The autonomous vehicle control system of claim 11, wherein:
the return beam configured for receipt by the receiver has the linear polarization; and
the linear polarization of the beam output by the transmitter, the linear polarization of the return beam, and arrangement of the receiver spaced from the transmitter on the integrated chip are configured to improve signal-to-noise ratio within the optical system compared with circularly polarized light.

13. The autonomous vehicle control system of claim 11, wherein the first wave plate and the second wave plate rotate the polarization of the beam by 45 degrees.

14. The autonomous vehicle control system of claim 11, wherein the receiver is a first receiver, and the optical module comprises:
a second receiver spaced from the first receiver;
a first displacer;
a wave plate;
a second displacer; and
a Faraday rotator located between the wave plate and the second displacer;
wherein the first displacer is located between the transmitter and the wave plate and is configured to provide a first component of the return beam to the first receiver and a second component of the return beam to the second receiver, the wave plate is configured to adjust the polarization of the beam, the first component, and the second component, the Faraday rotator is configured to output a magnetic field to adjust the polarization of the beam, the first component, and the second component, and the second displacer is configured to split the return beam into the first component and the second component.

15. The autonomous vehicle control system of claim 11, wherein the optical module comprises a circulator configured to adjust the polarization of the beam and a collimator configured to collimate the beam.

16. An autonomous vehicle, comprising:
a LIDAR sensor system, comprising:
a transmitter configured to output a beam having a linear polarization;
one or more scanning optics;
an optical module configured to provide the beam to the one or more scanning optics, the one or more scanning optics configured to output the beam received from the optical module, wherein the optical module comprises:
a displacer configured to displace a path of a return beam relative to a path along which the beam from the transmitter passes through the displacer;
a first wave plate configured to adjust the polarization of the beam;

a second wave plate configured to adjust the polarization of the beam;

a collimator located between the first wave plate and the second wave plate, the collimator configured to collimate the beam outputted by the first wave plate; and a Faraday rotator located between the displacer and the first wave plate, the Faraday rotator configured to output a magnetic field to adjust the polarization of the beam;

a receiver spaced from the transmitter on an integrated chip including both the transmitter and the receiver, the receiver configured to receive the return beam from reflection of the beam by an object; and one or more processors configured to:

determine at least one of a range to the object or a velocity of the object based on the beam; and a steering system;

a braking system; and a vehicle controller configured to:

determine, based on the return beam, at least one of a range to the object or a velocity of the object; and control operation of at least one of the steering system or the braking system based on the at least one of the range or the velocity.

17. The autonomous vehicle of claim 16, wherein the first wave plate and the second wave plate rotate the polarization of the beam by 45 degrees.

18. The autonomous vehicle of claim 16, wherein the first wave plate and the second wave plate comprise a quarter wave plate configured to adjust the polarization of the beam from linear polarization to circular polarization.

19. The autonomous vehicle of claim 16, wherein the scanning optics comprise a protected gold coating.

20. The autonomous vehicle of claim 16, wherein the receiver is a first receiver, the LIDAR sensor system comprises a second receiver spaced from the first receiver, and the optical module comprises:

a first displacer;

a wave plate;

a second displacer; and a Faraday rotator located between the wave plate and the second displacer;

wherein the first displacer is located between the transmitter and the wave plate and is configured to provide a first component of the return beam to the first receiver and a second component of the return beam to the second receiver, the wave plate is configured to adjust the polarization of the beam, the first component, and the second component, the Faraday rotator is configured to output a magnetic field to adjust the polarization of the beam, the first component, and the second component, and the second displacer is configured to split the return beam into the first component and the second component.

21. The autonomous vehicle of claim 16, wherein:

the receiver is configured to receive a linear polarization of the return beam; and the linear polarization of the beam output by the transmitter, the linear polarization of the return beam received by the receiver, and arrangement of the receiver spaced from the transmitter on the integrated chip are configured to improve signal-to-noise ratio of the LIDAR sensor system.

\* \* \* \* \*